(12) United States Patent
Tsuchiya et al.

(10) Patent No.: US 11,658,587 B2
(45) Date of Patent: May 23, 2023

(54) VIBRATION ACTUATOR, CAMERA PLATFORM, AND ELECTRONIC DEVICE

(71) Applicant: CANON KABUSHIKI KAISHA, Tokyo (JP)

(72) Inventors: Satoshi Tsuchiya, Saitama (JP); Satoru Kitajima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 127 days.

(21) Appl. No.: 17/379,848

(22) Filed: Jul. 19, 2021

(65) Prior Publication Data
US 2022/0029558 A1 Jan. 27, 2022

(30) Foreign Application Priority Data
Jul. 27, 2020 (JP) .............................. JP2020-126313

(51) Int. Cl.
*H02N 2/00* (2006.01)
*B06B 1/06* (2006.01)
*G03B 3/10* (2021.01)

(52) U.S. Cl.
CPC .............. *H02N 2/006* (2013.01); *B06B 1/06* (2013.01); *G03B 3/10* (2013.01); *H02N 2/0065* (2013.01); *G03B 2205/0061* (2013.01)

(58) Field of Classification Search
CPC ...... H02N 2/006; H02N 2/163; H02N 2/0065; G03B 3/10; G03B 2205/0061; B06B 1/06; B06B 1/0644
See application file for complete search history.

(56) References Cited

U.S. PATENT DOCUMENTS

2011/0273058 A1* 11/2011 Suefuji ................ H02N 2/0065
310/323.02

FOREIGN PATENT DOCUMENTS

JP            5631018 B2    11/2014
JP        2017108615 A     6/2017

* cited by examiner

*Primary Examiner* — Emily P Pham
(74) *Attorney, Agent, or Firm* — Canon U.S.A., Inc. IP Division

(57) ABSTRACT

A vibration actuator includes a vibrating body and a contact body having an annular shape. The vibrating body vibrates and includes an annular elastic body and an electro-mechanical energy conversion element. The contact body is in contact with the vibrating body and moves relative to the vibrating body. The contact body includes a base portion, a supporting portion annularly extending from the base portion in a radial direction of the annular shape of contact body, and a friction member that is on the supporting portion, is different in member from the supporting portion, and is in contact with the vibrating body. A first gap is between one end of the friction member and the supporting portion, and a second gap is between the one end of the friction member and the vibrating body.

9 Claims, 8 Drawing Sheets

FIG.8
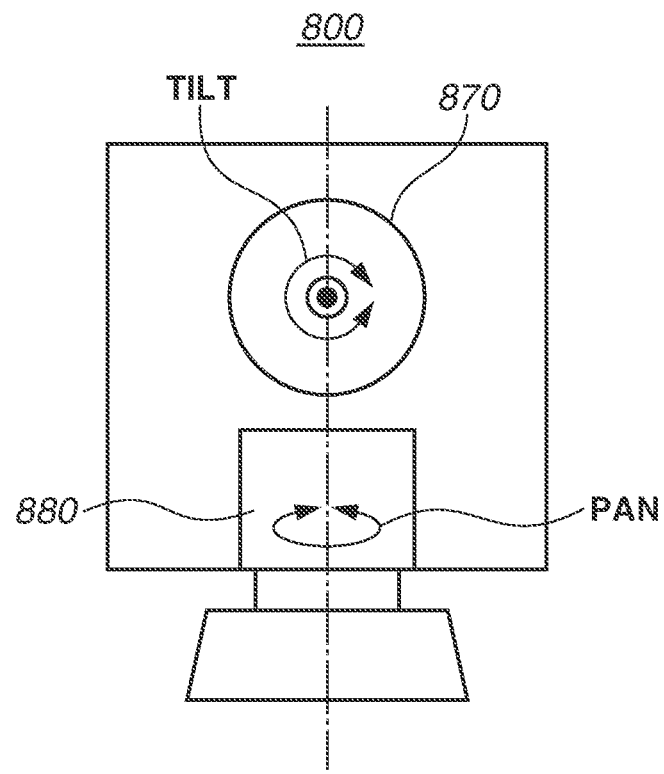
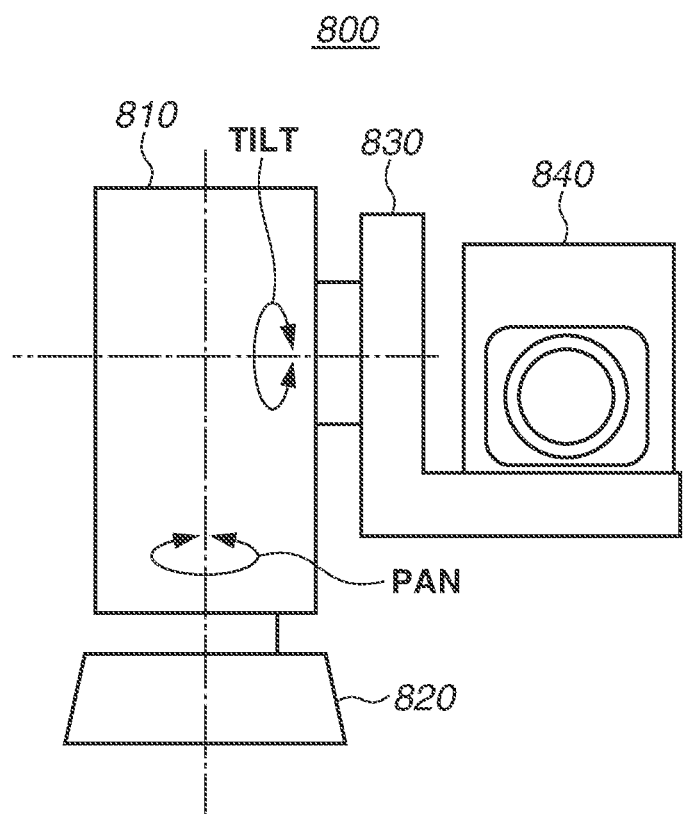

VIBRATION ACTUATOR, CAMERA PLATFORM, AND ELECTRONIC DEVICE

BACKGROUND

Field

The present disclosure relates to a vibration actuator including a vibrating body and a contact body.

Description of the Related Art

A vibration actuator including an annular vibrating body and an annular contact body in contact with the vibrating body, which has features such as low speed and large torque, has been put to practical use, for example, as an autofocus driving motor in an imaging lens of a single-lens reflex camera. In recent years, the vibration actuator is also expected to be applied to various electronic devices other than cameras, for example, to the joint driving of a robot arm, the rotational driving of a robot hand, the rotational driving of a camera platform of an imaging apparatus such as a monitoring camera, and the rotational driving of a photosensitive drum in an image forming apparatus.

The application to such various uses entails an increase in the productivity and a reduction in the cost of the vibration actuator. The contact body is in contact with the vibrating body at an appropriate pressure, thus including a part having spring properties (a contact spring). To manufacture a contact spring, there is a technique using a pressing process on a plate (see the publication of Japanese Patent No. 5631018). This technique involves manufacturing an annular contact spring separately from the main body portion of an annular contact body and then bonding the annular contact spring and the main body portion together. The contact spring also has a contact surface to be in contact with a vibrating body.

However, as illustrated in FIG. 6 in the publication of Japanese Patent No. 5631018, manufacturing a contact surface involves a bending process, which leads to difficulty processing the contact surface of an annular contact spring and the contact surface of an annular vibrating body with high dimension and surface accuracies. Further, an annular contact spring has an end portion with irregularities such as fins or shear drops, which means that the processing accuracy is not very high. This results in increase in the flatness of the friction surface of the contact spring, which causes erratic rotation of the contact body or unstable contact surface pressure on the vibrating body due to irregularities on the end portion, presenting abnormal wear.

SUMMARY

The present disclosure is directed to providing a vibration actuator preventing erratic rotation and abnormal wear.

According to an aspect of the present disclosure, a vibration actuator includes a vibrating body configured to vibrate and including an annular elastic body and an electro-mechanical energy conversion element, and a contact body having an annular shape, wherein the contact body is in contact with the vibrating body and configured to move relative to the vibrating body, wherein the contact body includes: a base portion, a supporting portion annularly extending from the base portion in a radial direction of the annular shape of contact body, and a friction member that is on the supporting portion, is different in member from the supporting portion, and is in contact with the vibrating body, and wherein a first gap is between one end of the friction member and the supporting portion, and a second gap is between the one end of the friction member and the vibrating body.

Further features of the present disclosure will become apparent from the following description of exemplary embodiments with reference to the attached drawings.

BRIEF DESCRIPTION OF THE DRAWINGS

FIG. 8 is a diagram schematically illustrating a configuration of a camera platform on which the vibration actuator according to the exemplary embodiment of the present disclosure is mounted and an imaging apparatus mounted on the camera platform.

DESCRIPTION OF THE EMBODIMENTS

With reference to the attached drawings, some exemplary embodiments of the present disclosure will be described in detail below.

Figure 1:
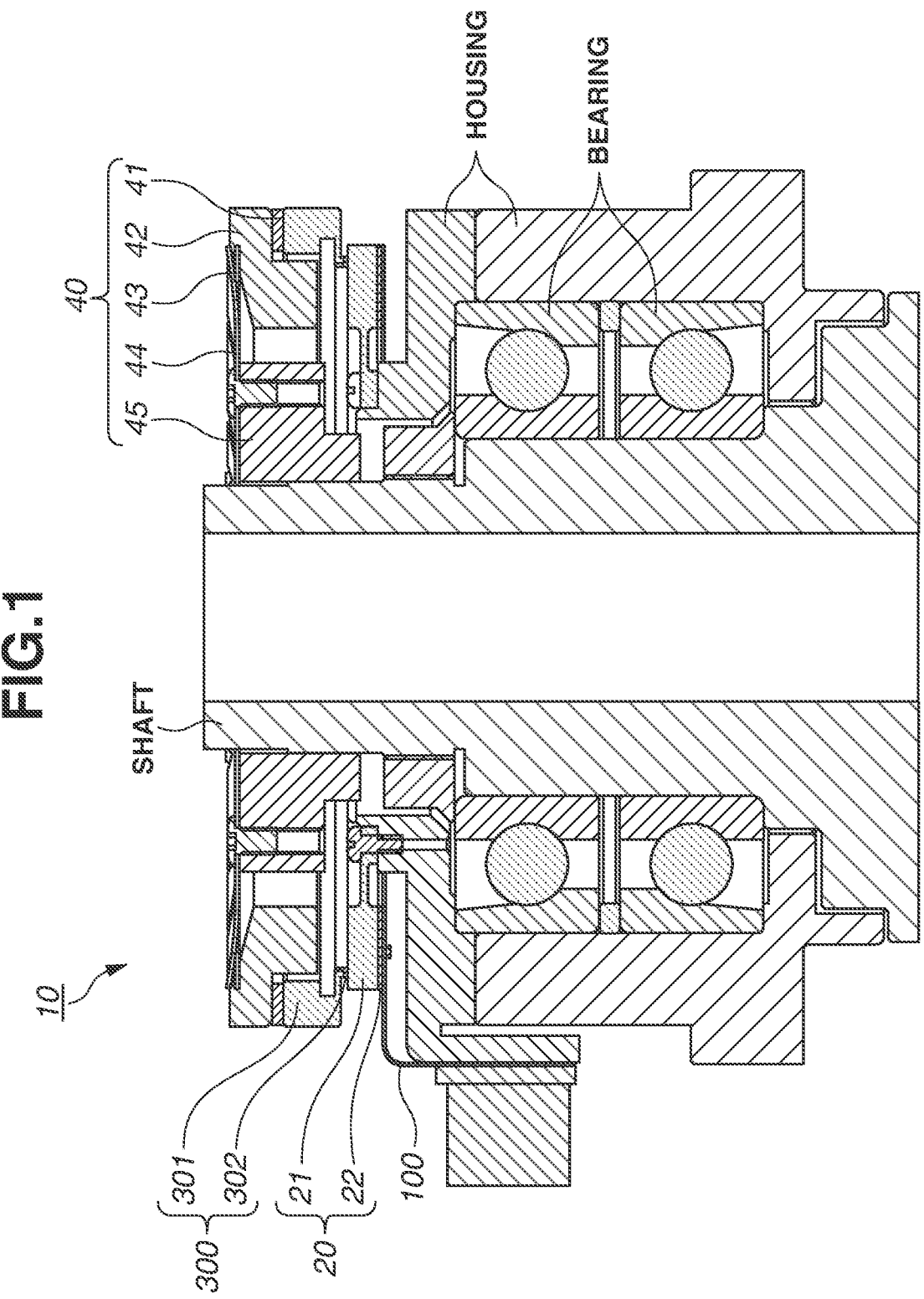
FIG. 1 is a cross-sectional view schematically illustrating a configuration of a vibration actuator according to a first exemplary embodiment of the present disclosure.

FIG. 1 is a cross-sectional view schematically illustrating a configuration of a vibration actuator 10 according to a first exemplary embodiment of the present disclosure. Mechanical components such as a vibrating body 20, a contact body 300 (also referred to as a "moving body" or a "driven body"), and a pressurization mechanism 40 in the vibration actuator 10 are functionally equivalent to those in a vibration actuator discussed in the publication of Japanese Patent Application Laid-Open No. 2017-108615, for example.

A vibration actuator according to the present exemplary embodiment includes a vibrating body including an elastic body and an electro-mechanical energy conversion element, and a contact body in contact with the vibrating body. Additionally, the vibration actuator includes a power supply member (a flexible printed circuit board) to supply power to the electro-mechanical energy conversion element.

In FIG. 1, a vibration actuator 10 includes a vibrating body 20 in an annular shape, a contact body 300 in an annular form, and a pressurization mechanism 40. The vibration actuator 10 also includes a shaft, a housing, and a bearing.

The vibrating body 20 includes an elastic body 21, a piezoelectric element 22 as an electro-mechanical energy conversion element joined to the elastic body 21, and a power supply member 100 joined to the piezoelectric element 22 to apply a driving voltage as an alternating current voltage to the piezoelectric element 22.

The pressurization mechanism 40 includes a vibration damping rubber 41, a pressure spring reception member 42, a pressure spring reception rubber 43, a pressure spring 44, and a pressure spring fixing member 45. The vibrating body 20 and the contact body 300 are disposed on concentric circles with the shaft as the central axis in pressure contact (friction contact) with each other in the thrust direction of the shaft by the pressurization mechanism 40 fixed to the shaft. Specifically, the pressure spring 44, which is restricted not to move by the pressure spring fixing member 45 fixed to the shaft, presses the contact body 300 in the thrust direction through the vibration damping rubber 41, the pressure spring reception member 42, and the pressure spring reception rubber 43. Such a configuration achieves a stable contact between the contact body 300 and the vibrating body 20.

In the vibration actuator 10, a driving voltage as an alternating current voltage applied to the piezoelectric element 22 through the power supply member 100 causes a driving vibration in the vibrating body 20. Although the form of the driving vibration depends on the number of electrodes included in the piezoelectric element 22 and the arrangement of the electrodes, the piezoelectric element 22 is designed to cause a driving vibration with an n-dimensional (n=9 in the present exemplary embodiment) traveling wave traveling in a circumferential direction of the vibrating body 20. The n-dimensional driving vibration is a bending vibration of which the wavenumber in a circumferential direction of the vibrating body 20 is n. The driving vibration generated in the piezoelectric element 22 causes the traveling wave generated in a contact portion 25 of the vibrating body 20 to drive the contact body 300 in a circumferential direction about the shaft. That means that the contact body 300 rotates relative to the vibrating body 20 in a concentric circle with the vibrating body 20. A rotational force generated in the contact body 300 is output to outside via the pressurization mechanism 40 and the shaft.

The vibration actuator 10 according to the present exemplary embodiment illustrated in FIG. 1, for example, can unrestrictedly rotate an operation target such as a camera fixed to a flange surface formed to spread toward the end of the lower part of the shaft with the housing fixed to a desired member. On the other hand, the vibration actuator 10 can rotate the housing with the shaft fixed.

Figure 2:
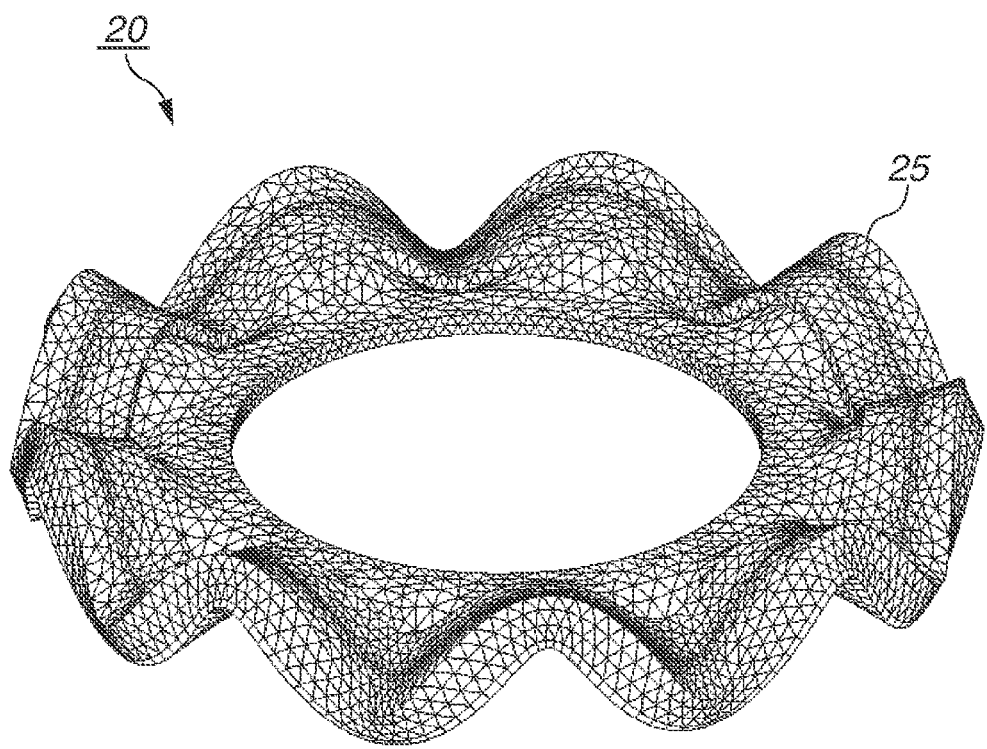
FIG. 2 is a diagram illustrating a form of deformation of a driving vibration caused in a vibrating body according to the present disclosure.

FIG. 2 is a diagram illustrating the form of deformation of the driving vibration caused in the vibrating body 20. In FIG. 2, for easy understanding of the displacement of the driving vibration caused in the vibrating body 20, the displacement is drawn to be greater than the reality.

Figure 3:
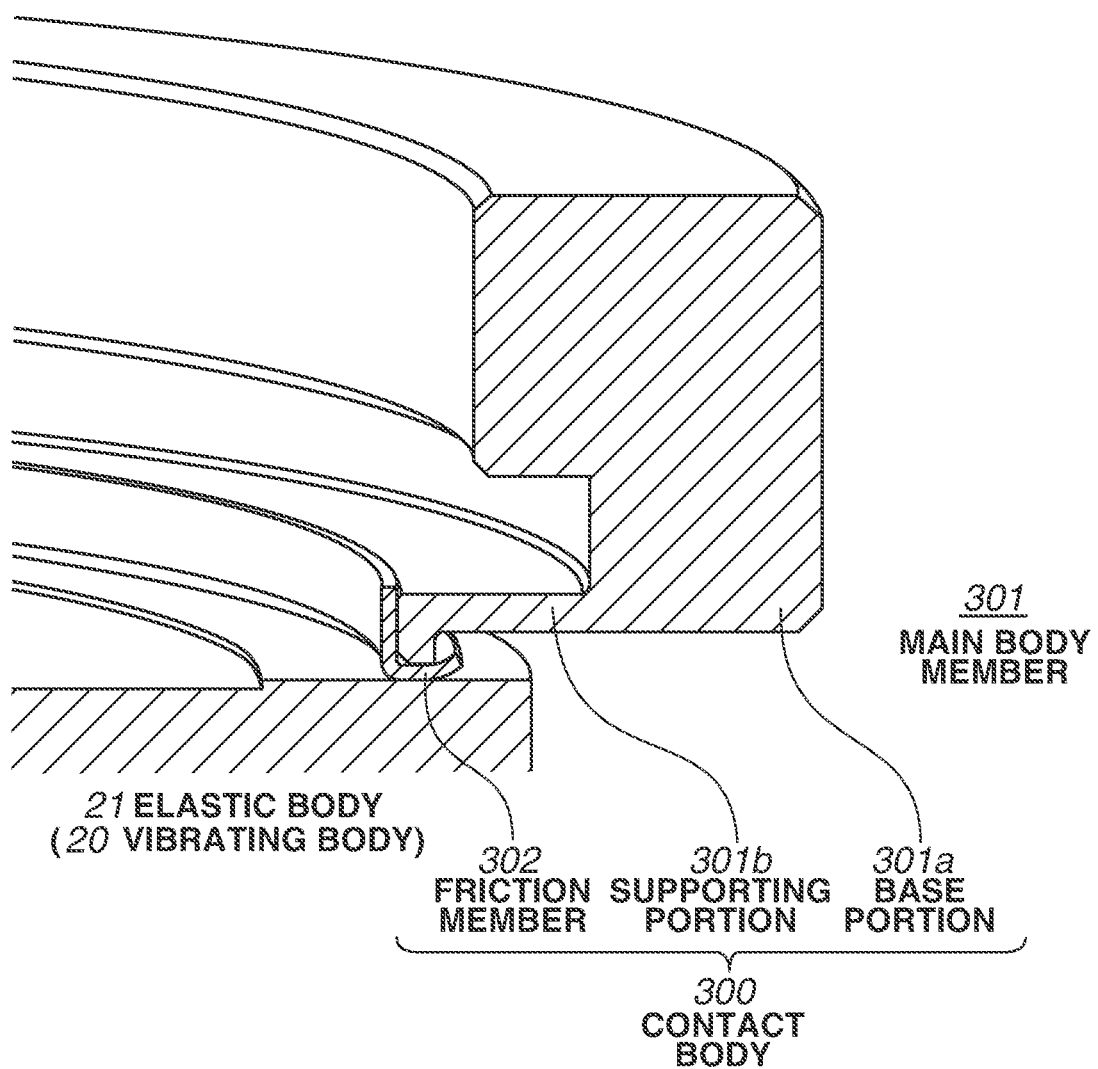
FIG. 3 is a diagram schematically illustrating a configuration of a contact body according to the present disclosure.

FIG. 3 is a cross-sectional perspective view schematically illustrating a configuration of the contact body 300. The contact body 300 includes a main body member 301 and a friction member 302 different in member from the main body member 301. The main body member 301 and the friction member 302 are linked to each other by adhesion or joining.

The main body member 301 includes a base portion 301a and a supporting portion 301b annularly extending in the radial direction of the contact body 300. The supporting portion 301b has an approximately L-shaped cross section, and has an end portion linked to the friction member 302. The main body member 301 forms in an annular shape.

Figure 4:
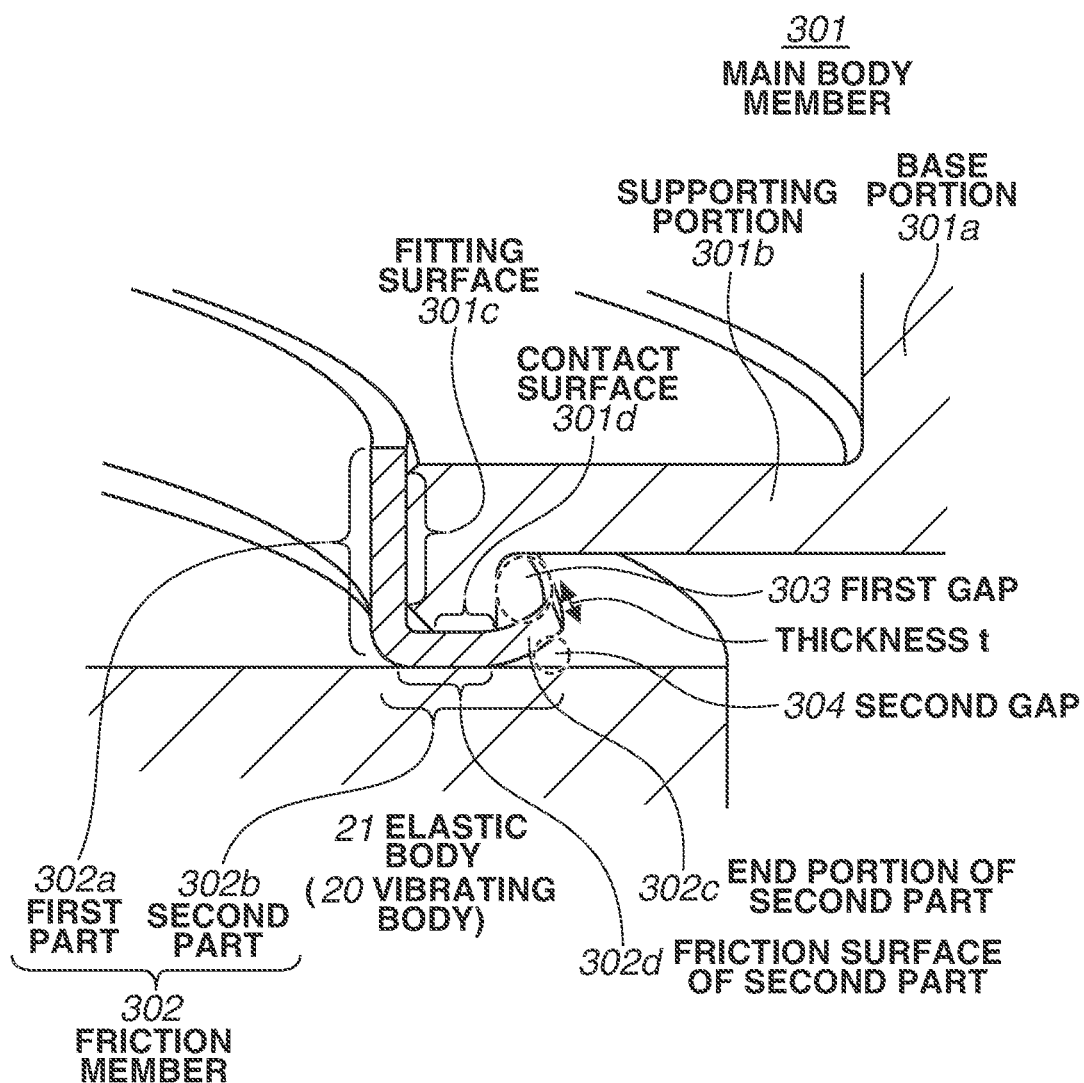
FIG. 4 is a diagram schematically illustrating a configuration of a supporting portion and a friction member of the contact body according to the present disclosure.

FIG. 4 is a cross-sectional perspective view schematically illustrating a configuration of the supporting portion 301b and the friction member 302 of the contact body 300. The friction member 302 has an approximately L-shaped cross section in an annular form. The friction member 302 includes a first part 302a extending in the direction along the central axis of the contact body 300, and a second part 302b extending along the radial direction of the contact body 300.

The first part 302a is internally fitted to the supporting portion 301b (fitted to the inside diameter side of the supporting portion 301b). The second part 302b is linked to a contact surface 301d of the supporting portion 301b. Although described below, the first part 302a is fitted to the supporting portion 301b either internally or externally.

An end portion 302c of the second part 302b protrudes in the radial direction from the contact surface 301d of the supporting portion 301b, and the end portion 302c is not linked to the supporting portion 301b. A friction surface 302d, on the opposite side of the contact surface 301d, of the second part 302b is in contact with the vibrating body 20. The end portion 302c of the second part 302b is inclined in a direction away from the vibrating body 20, out of contact with the vibrating body 20. That means that a first gap 303 is between the second part 302b and the supporting portion 301b, and a second gap 304 is between the second part 302b and the vibrating body 20.

The effects of the first gap 303 will be described. The main body member 301 has high stiffness as a component, allowing the manufacture with high accuracy. On the other hand, the friction member 302, however, deforms largely in manufacturing processes such as pressing or quenching treatment. The friction member 302 has low stiffness as a component, allowing easy elastic deformation in it. Thus, the friction member 302 is brought into contact with the contact surface 301d of the supporting portion 301b to follow the contact surface 301d, improving (decreasing) the flatness of the friction surface 302d. Further, the first gap 303 allows the irregularities (a fin or sheer drop) on the end portion 302c of the friction member 302 not to come into contact with the supporting portion 301b, improving the flatness of the friction surface 302d. This reduces the erratic rotation of the contact body 300.

The effects of the second gap 304 will be described. The second gap 304 allows the irregularities (a fin or a shear drop) on the end portion 302c of the second part 302b not to come into contact with the vibrating body 20, stabilizing the contact surface pressure of the friction surface 302d, and reducing abnormal wear. In the manufacturing process of the contact body 300, this simplifies or eliminates some processes such as lapping for smoothing the friction surface 302d, reducing cost.

The length of the end portion 302c of the second part 302b differs depending on the size of irregularities (a fin or a shear drop) on the end portion 302c. In one or more embodiments, the length is 0.2t or more from the end surface of the end portion 302c where the thickness of the end portion 302c is t.

The friction surface 302d of the contact body 300 is in contact with the vibrating body 20, and the supporting portion 301b functions as a contact spring. Variation in the spring stiffness of the contact spring causes abnormal noise (a creak) from the vibration actuator 10. Thus, the supporting portion 301b as the contact spring is made of a material having a low Young's modulus such as an aluminum alloy or brass to reduce the variation even with processing error. On the other hand, as the friction member 302 is in friction contact with the vibrating body 20, the friction member 302 is made of a material having high wear resistance such as steel. A material with high wear resistance such as steel is typically hard and has a high Young's modulus compared with materials such as aluminum alloys or brass. In other words, the Young's modulus of a material for the supporting portion 301b is lower than that of a material for the friction member 302.

The base portion 301a is in contact with the vibration damping rubber 41, reducing the abnormal noise from the vibration actuator 10 as an attenuation effect.

The following is a description of the materials for the main body member 301 and the friction member 302 and the methods of manufacturing the main body member 301 and the friction member 302. The friction member 302 is made of a material having high wear resistance, and is manufactured with a plate of a steel material such as stainless steel through pressing and quenching treatment. On the other hand, the main body member 301 has a vibration attenuation function, and is made of a material having high attenuation performance, which is also a free-cutting material that can be processed with high accuracy. Thus, the main body member 301 can be manufactured by cutting, made of an aluminum alloy or brass, which has a higher free-cutting property than the friction member 302 has. In one or more embodiments, the main body member 301 is subjected to surface treatment. For example, the main body member 301 made of an aluminum alloy is subjected to alumite treatment. The methods of manufacturing the friction member 302 and the main body member 301 are not limited to the above methods. Examples of a method of manufacturing the friction member 302 include laser beam machining, electrical discharge machining, cutting, etching, and methods combining these. Examples of heat treatment of the friction member 302 include nitriding and carburizing. In one or more embodiments, other than heat treatment, hardening treatment such as plating is used. Examples of a method of manufacturing the main body member 301 include die casting, forging, and methods combining these.

The assemblage of the main body member 301 and the friction member 302 will be described. The main body member 301 has high stiffness as a component and can be manufactured with higher accuracy than the friction member 302. On the other hand, the friction member 302 is largely deformed in manufacturing processes such as pressing or quenching treatment.

The friction member 302 has low stiffness as a component, which allows easy elastic deformation in it. Thus, fitting the friction member 302 being deformed to the main body member 301 with respect to the main body member 301 with high accuracy prevents the friction member 302 from being attached to an improper position and improves the circularity of the friction surface 302d. To avoid friction between the metal surfaces of the main body member 301 and the friction member 302, the main body member 301 and the friction member 302 are linked to each other by adhesion or joining, reducing abnormal noise (a creak) from the vibration actuator 10. In one or more embodiments, the first gap 303 is filled with an adhesive or a joint material used in adhesion or joining.

In the present exemplary embodiment and the following variations, one end of a friction member is disposed with a first gap between the one end and a supporting portion and a second gap between the one end and a vibrating body. This allows the flatness of the friction surface to be reduced, reducing the erratic rotation of the contact body. In addition, irregularities (a fin or a shear drop) on the friction member are out of contact with the vibrating body, reducing abnormal wear.

Figure 5:
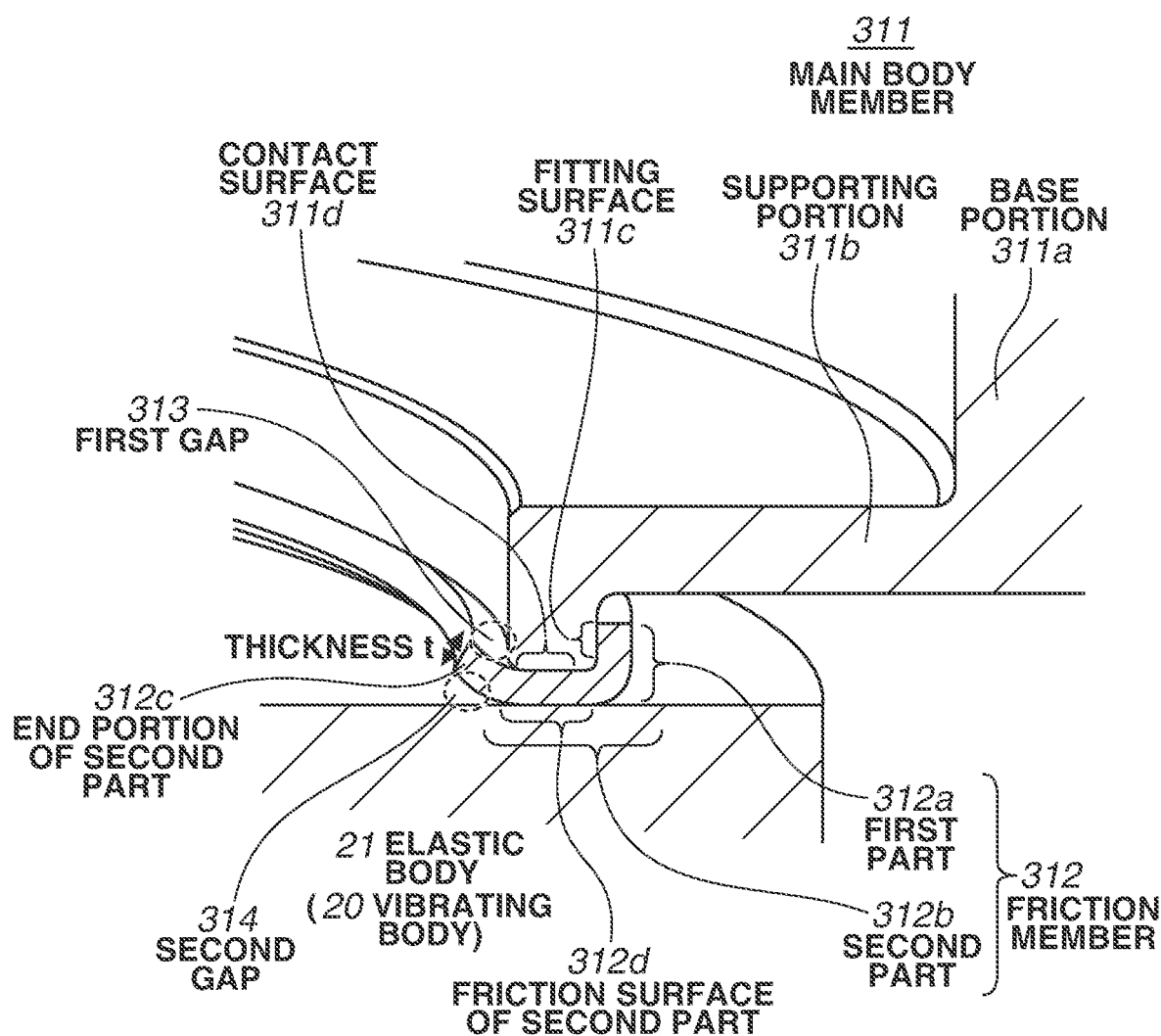
FIG. 5 is a diagram schematically illustrating a configuration of a first variation of the supporting portion and the friction member of the contact body according to the present disclosure.

FIG. 5 is a diagram illustrating an example of a variation of the present exemplary embodiment. A contact body includes a main body member 311 and a friction member 312 different in member from the main body member 311. The main body member 311 forms in an annular shape and includes a base portion 311a and a supporting portion 311b. The friction member 312, which forms in an annular shape, has an approximately J-shaped cross section and includes a first part 312a extending in the direction along the central axis of the contact body, and a second part 312b extending in the radial direction of the contact body. The first part 312a is fitted to a fitting surface 311c of the supporting portion 311b externally (fitted to the outer circumferential side of the supporting portion 311b). The second part 312b is in contact with a contact surface 311d of the supporting portion 311b and a friction surface 312d on the opposite side of the contact surface 311d is in contact with the vibrating body 20. An end portion 312c of the second part 312b protrudes further in the radial direction than the contact surface 311d of the supporting portion 311b. Around the end portion 312c, a first gap 313 is between the second part 312b and the supporting portion 311b, and a second gap 314 is between the second part 312b and the vibrating body 20. The configuration of this variation also has the effects similar to those of the present exemplary embodiment.

Figure 6:
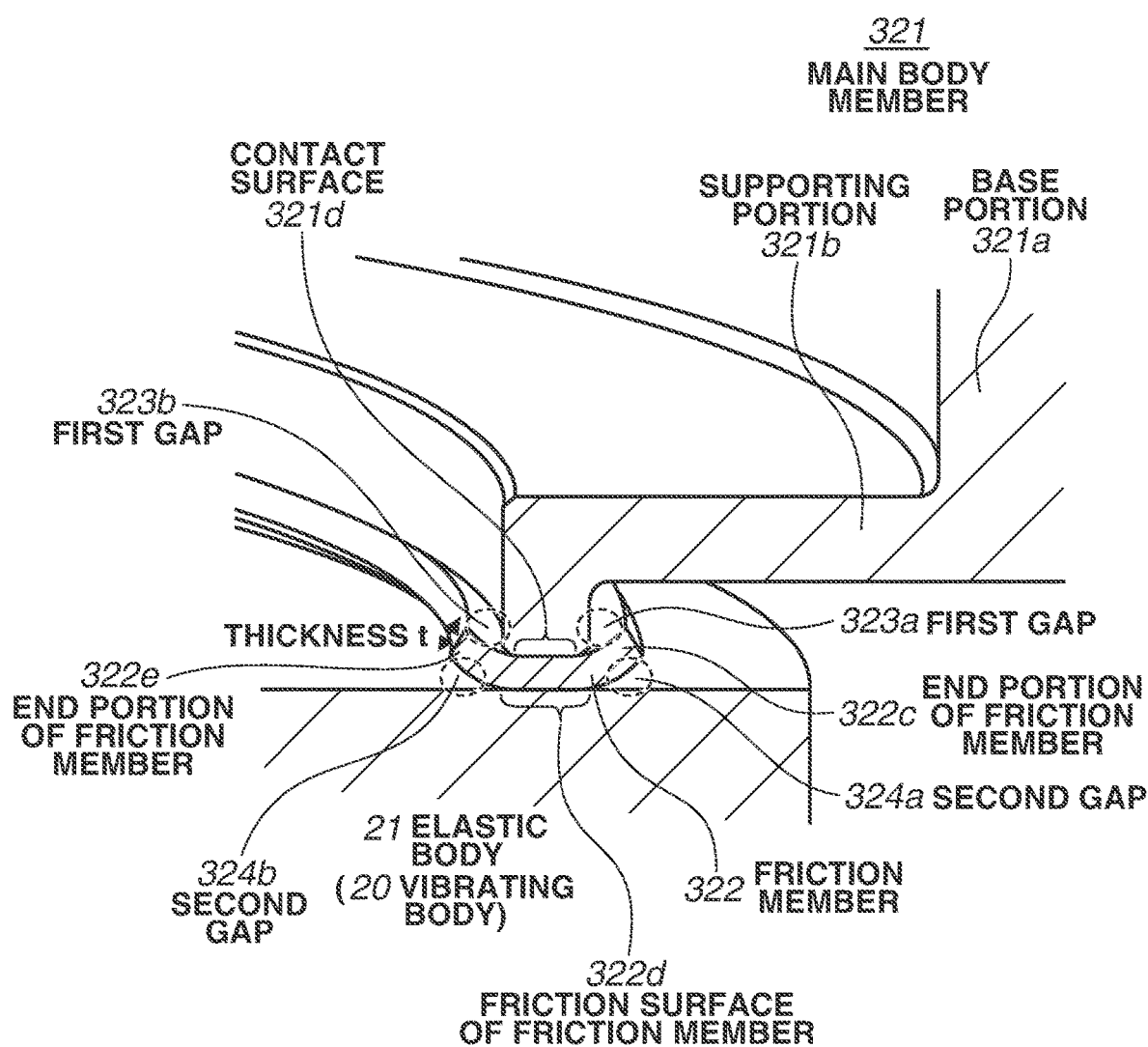
FIG. 6 is a diagram schematically illustrating a configuration of a second variation of the supporting portion and the friction member of the contact body according to the present disclosure.

FIG. 6 is a diagram illustrating an example of a variation of the present exemplary embodiment. A contact body includes a main body member 321 and a friction member 322 different in member from the main body member 321. The main body member 321 includes a base portion 321a and a supporting portion 321b and forms in an annular shape. The friction member 322, which forms in an annular shape, has an approximately rectangular cross section with curved end portions of the rectangle. In this variation, the friction member 322 is not fitted to the supporting portion 321b, but is in contact with a contact surface 321d of the supporting portion 321b and a friction surface 322d on the opposite side of the contact surface 321d is in contact with the vibrating body 20. Both end portions 322c and 322e of the friction member 322 each protrude further in the radial direction than the contact surface 321d of the supporting portion 321b. Around the end portion 322c of the friction member 322, a first gap 323a is between the friction member 322 and the supporting portion 321b, and a second gap 324a is between the friction member 322 and the vibrating body 20. Around the end portion 322e of the friction member 322, a first gap 323b is between the friction member 322 and the supporting portion 321b, and a second gap 324b is between the friction member 322 and the vibrating body 20. The configuration of this variation also has the effects similar to those of the present exemplary embodiment. With the configuration of this variation, a contact body is manufacturable even with a thick friction member, which entails difficult bending.

Figure 7:
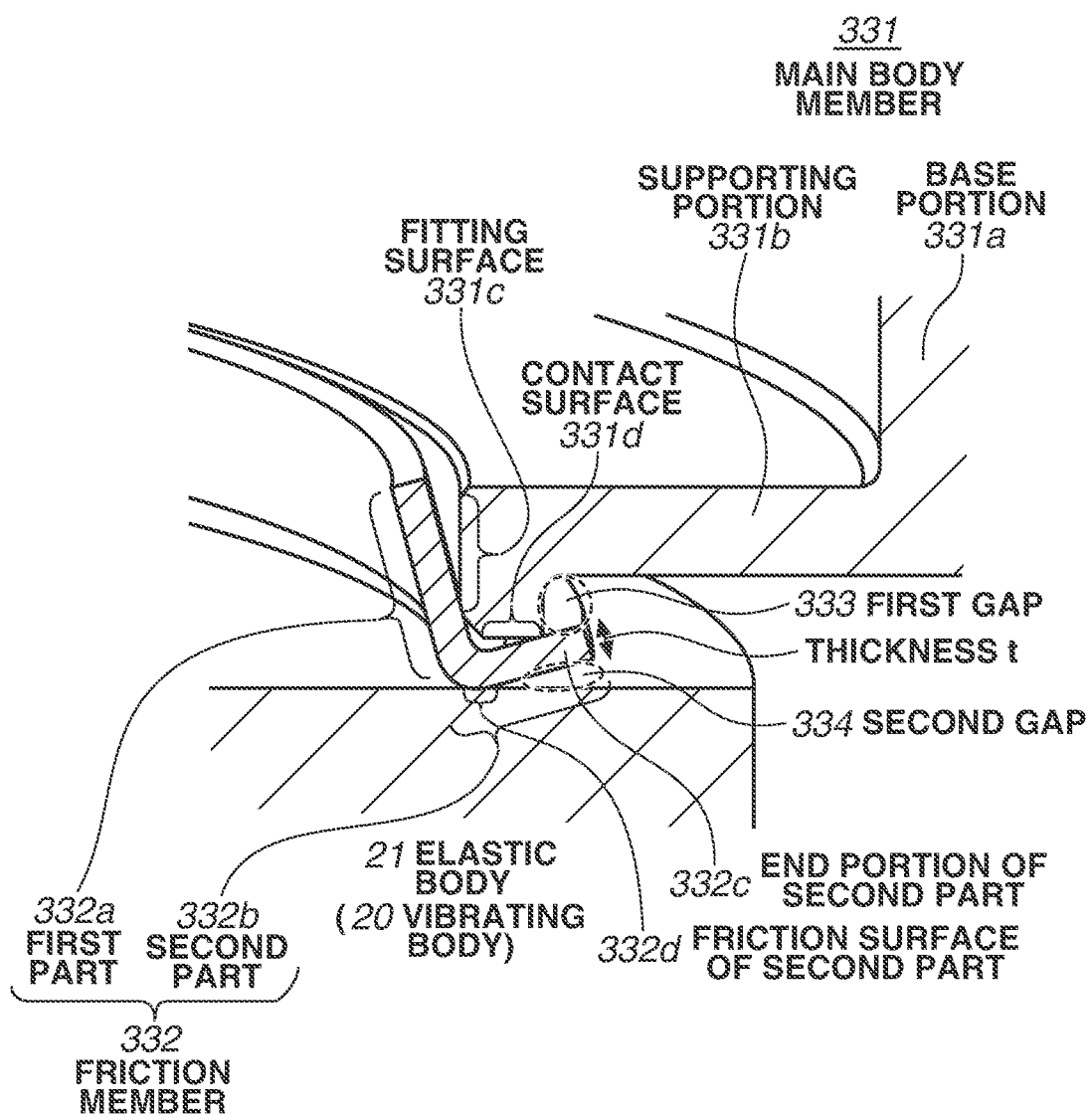
FIG. 7 is a diagram schematically illustrating a configuration of a third variation of the supporting portion and the friction member of the contact body according to the present disclosure.

FIG. 7 is a diagram illustrating an example of a variation of the present exemplary embodiment. A contact body includes a main body member 331 and a friction member 332 different in member from the main body member 331. The main body member 331, which forms in an annular shape, includes a base portion 331a and a supporting portion 331b. The friction member 332, which forms in an annular shape, has an approximately L-shaped cross section, and includes a first part 332a extending in a direction along the central axis of the annular contact body, and a second part 332b extending in the radial direction of the contact body. The first part 332a is inclined to the fitting surface 331c, internally in contact with a fitting surface 331c of the supporting portion 331b. The second part 332b is also inclined to the contact surface 331d and a friction surface 332d, on the opposite side of the contact surface 331d, of the second part 332b is in contact with the vibrating body 20. In one or more embodiments, the curved friction surface 332d is flattened by lapping. The second part 332b has an end portion 332c protruding further in the radial direction than the contact surface 331d of the supporting portion 331b. Around the end portion 332c, a first gap 333 is between the second part 332b and the supporting portion 331b, and a second gap 334 is between the second part 332b and the vibrating body 20. The configuration of this variation also has the effects similar to those of the present exemplary embodiment.

In the present exemplary embodiment, the configuration has been described in which a supporting portion horizontally extends from a base portion of a contact body in the direction of the inner circumference of the contact body. The present disclosure, however, is not limited to this. Alternatively, the supporting portion may extend from the base portion of the contact body in the direction of the outer circumference of the contact body. Yet alternatively, the supporting portion may obliquely extend from the base portion of the contact body in a direction along the inner or outer circumference. These configurations also have the effects similar to those of the present exemplary embodiment.

In the present exemplary embodiment, the configuration has been described in which the cross-sectional shape of a supporting portion of a contact body forms in a cantilever beam shape with a friction member fitted to one end portion of the beam. The present disclosure, however, is not limited to this. Alternatively, a configuration may be employed in which the friction member is fitted to a location other than the one end portion of the supporting portion. Yet alternatively, a configuration may be employed in which the cross-sectional shape of the supporting portion forms in a doubly supported beam shape with the friction member fitted to the center portion of the beam. These configurations also have the effects similar to those of the present exemplary embodiment.

In the present exemplary embodiment, the configuration has been described in which a friction member forms in a closed annular shape. The present disclosure, however, is not limited to this. Alternatively, an annular friction member may be partially open, or may form in an approximately annular shape. These configurations also have the effects similar to those of the present exemplary embodiment. The drawings of the present exemplary embodiment illustrate the configurations in which processing error and deformation in the manufacturing process are not taken into account. The present disclosure, however, is not limited to this. An actually manufactured contact body has a radius of an angular portion or a corner portion greater than the corresponding one in the drawings, has a shear drop or a fin, and/or has uneven gap between the main body member and the friction member. These configurations also have the effects similar to those of the present exemplary embodiment.

The drawings of the present exemplary embodiment illustrate the configurations in which the entire circumference of a friction surface of an elastic body on a contact portion is flat. The present disclosure, however, is not limited to this. Alternatively, a configuration may be employed in which radial grooves are formed in the contact surface of the elastic body, the friction surface of which offers projections in it. This configuration also has the effects similar to those of the present exemplary embodiment.

In a second exemplary embodiment, a configuration will be described of a camera platform of an imaging apparatus, such as a monitoring camera, as an example of an apparatus provided with the vibration actuator 10 described in the first exemplary embodiment.

The following is a description of a camera platform including a rotating platform and vibration actuators mounted on the rotating platform according to the present exemplary embodiment.

FIG. 8 is a diagram schematically illustrating a configuration of a camera platform 800 and an imaging apparatus 840 mounted on the camera platform 800. The camera platform 800 includes a base 820, a head 810 including two vibration actuators 870 and 880, and an L-angle 830 for fixing the imaging apparatus 840. The vibration actuator 880 along the pan axis is an actuator for rotating the head 810, the L-angle 830, and the imaging apparatus 840 about the pan axis relative to the base 820. The vibration actuator 870 along the tilt axis is an actuator for rotating the L-angle 830 and the imaging apparatus 840 about the tilt axis relative to the head 810.

The two vibration actuators 870 and 880 used in the camera platform 800 enables the orientation of the imaging apparatus 840 to be changed at high speed and high response with high accuracy and low noise. Each vibration actuator has a high holding torque even in the non-energized state, allowing the orientation of the image apparatus 840 to be held as it is without consuming power of the vibration actuator even with a shifted center of gravity about the tilt axis of the imaging apparatus 840.

Additionally, an electronic device including a member desired by a user that uses the present disclosure and a vibration actuator included in the member can be provided.

The above disclosure provides a vibration actuator that reduces erratic rotation and abnormal wear.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-126313, filed Jul. 27, 2020, which is hereby incorporated by reference herein in its entirety.

What is claimed is:

1. A vibration actuator comprising:
   a vibrating body configured to vibrate and including an annular elastic body and an electro-mechanical energy conversion element; and
   a contact body having an annular shape, wherein the contact body is in contact with the vibrating body and configured to move relative to the vibrating body,
   wherein the contact body includes:
   a base portion,
   a supporting portion annularly extending from the base portion in a radial direction of the annular shape of contact body, and
   a friction member that is on the supporting portion, is different in member from the supporting portion, and is in contact with the vibrating body, and
   wherein a first gap is between one end of the friction member and the supporting portion, and a second gap is between the one end of the friction member and the vibrating body.

2. The vibration actuator according to claim 1,
wherein the friction member includes a first part extending in a direction along a central axis of the contact body, and a second part annularly extending in the radial direction,
wherein the first part and the second part are linked to the supporting portion, and
wherein the first gap is between the supporting portion and the second part, and the second gap is between the vibrating body and the second part.

3. The vibration actuator according to claim 2, wherein the first part is linked to the supporting portion by either one of internal fitting or external fitting.

4. The vibration actuator according to claim 1, wherein the one end of the friction member has a length that is greater than or equal to 0.2t from an end surface, where t is a thickness of the one end of the friction member.

5. The vibration actuator according to claim 1, wherein a Young's modulus of a material of the supporting portion is lower than a Young's modulus of a material of the friction member.

6. The vibration actuator according to claim 1, wherein a material of the friction member is steel, and a material of the supporting portion is an aluminum alloy or brass.

7. The vibration actuator according to claim 1, wherein the friction member is on an end portion of the supporting portion.

8. A camera platform comprising:
a rotating platform; and
the vibration actuator according to claim 1 included in the rotating platform.

9. An electronic device comprising:
a member; and
the vibration actuator according to claim 1 included in the member of the electronic device.

* * * * *